Oct. 28, 1969    F. DEUTSCH ET AL    3,474,495
EXTRUSION DIE

Filed Jan. 12, 1967    5 Sheets-Sheet 1

FIG.1

INVENTORS
FRED DEUTSCH
LAWRENCE S. DEUTSCH
JAMES S. DEUTSCH
BY
ATTORNEY

INVENTORS
FRED DEUTSCH
LAWRENCE S. DEUTSCH
JAMES S. DEUTSCH
BY
ATTORNEY

Oct. 28, 1969   F. DEUTSCH ET AL   3,474,495
EXTRUSION DIE
Filed Jan. 12, 1967    5 Sheets-Sheet 3

INVENTORS
FRED DEUTSCH
LAWRENCE S. DEUTSCH
JAMES S. DEUTSCH
BY
ATTORNEY

Oct. 28, 1969

F. DEUTSCH ET AL 3,474,495

EXTRUSION DIE

Filed Jan. 12, 1967

INVENTORS
FRED DEUTSCH
LAWRENCE S. DEUTSCH
JAMES S. DEUTSCH
BY 
ATTORNEY

United States Patent Office 3,474,495
Patented Oct. 28, 1969

3,474,495
EXTRUSION DIE
Fred Deutsch, Lawrence S. Deutsch, and James S. Deutsch, University City, Mo. (all of 5350 Bischoff Ave., St. Louis, Mo. 63110)
Filed Jan. 12, 1967, Ser. No. 608,807
Int. Cl. B29f 3/04
U.S. Cl. 18—12                                   16 Claims

ABSTRACT OF THE DISCLOSURE

An extrusion die having a manifold which includes two channels diverging from a single inlet port and opening at their forward ends into an accumulation cavity, the forward end of which is defined by a distributor plate having a plurality of apertures therein. A face plate mounted on the die-body beyond the distributor plate and having a plurality of individually adjustable extrusion apertures. A feeder head mounted within the die-body and having feeder tips projecting forwardly toward the extrusion apertures for forming tubular extrusions and extrusions with solid material embedded therein. A feeder channel extending through the die-body and communicating with the feeder tips for feeding the solid material into the plastic melt. Removable inserts having extrusion apertures therein and adapted to be optionally held in the face plate.

---

This invention relates in general to extrusion dies and, more particularly, to an extrusion die from which multiple and sheet extrusions can be obtained.

As a matter of economy, it is desirable to extrude a number of extrusions from a single die for in this manner it is possible to take maximum advantage of expensive extruding machinery. Heretofore, this end has been difficult to achieve by reason of the fact that no suitable manifold structure had been developed for distributing the pressure of the plastic melt equally across all of the extrusion apertures of the die. Of course, pressure differentials within the plastic mass immediately behind the extrusion apertures result in unequal extrusion rates as well as discrepancies in the size of the material ultimately extruded. This same problem exists in dies adapted to extrude sheet material for unless the pressure of the plastic melt is substantially uniform across the entire length of the extrusion slit, the extruded sheet will not possess a uniform thickness. The die of the present invention overcomes this problem by dividing the flow of fluent material into separate channels which again merge within an accumulator plate located to the rear of the extrusion apertures, thereby establishing a substantially uniform pressure in the plastic melt for the entire width of the accumulator plate.

Furthermore, conventional dies are capable of producing one type of extrusion such as a solid or tubular extruded structure. By altering feeder heads forming part of the present invention, an extremely simple operation requiring only a few minutes, the present die can be converted from a device capable of producing tubular extrusions to one capable of producing solid extrusions, or vice versa. By the same token, a further change of feeder heads provides the present die with the capability of extruding objects having wires, gauze, mesh ribbons, and the like embedded therein.

Moreover, conventional extrusion dies require a different face plate for each different cross-sectional configuration extruded. The die of the present invention eliminates this problem by employing adjustable die lips which can be easily moved to precisely adjust as well as vary the size of the extrusion aperture. It is further possible to utilize these adjustable lips as vise-like jaws for holding removable extrusion inserts in the path of the plastic melt. Thus, to change the cross-sectional configuration of the extruded material, it is only necessary to change the extrusion insert and not an entire face plate. This saves considerable time and expense.

Among the several objects of the present invention may be noted the provisions of an extrusion die from which multiple extrusions can be obtained; the provision of an extrusion die of the type stated wherein the pressure within the plastic melt to the rear of the extrusion apertures remains substantially constant across the entire width of the die; the provision of an extrusion die from which extrusions of various sizes and shapes can be obtained with minimum inconvenience and delay and without making major alterations to the die itself; the provision of a die which permits precise control over the size of the extruded product; the provision of a die which can be set up with a minimum of inconvenience to extrude tubular or solid extrusions or extrusions having flexible material embedded therein; and the provision of an extrusion die which is durable and rugged in construction and economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated.

Corresponding reference characters indicate corresponding parts throughout the several views of the drawings.

Referring now in more detail and by reference characters to the drawings, which illustrate practical embodiments of the present invention, 2 designates an extrusion die including a circular gate 4 having a plurality of circumferentially spaced notches 6 along its outer periphery for accepting bolts (not shown) which thread into the end of the barrel of an extrusion machine so as to securely hold extrusion die 2 on the extrusion machine. Inasmuch as the extrusion machine forms no part of the present invention, it is neither illustrated nor described. Gate 4 is centrally provided with an inlet port or aperture 10 and in encircling relation thereto is relieved from its rear face in the provision of an annular recess 12. Snugly fitted within recess 12 is a webbed circular reinforcing member 14 and fitted against reinforcing member 14 also within recess 12 is a circular screen 16 for straining contaminants from the plastic melt before it enters die 2. In this connection, it should be noted that with minor alterations the screen of the extrusion machine can be fitted at its end with a blade which wipes the exposed face of screen 16 so that contaminants do not clog the apertures therein. Of course, if such is the case, it is desirable to form screen 16 from a hardened steel. Welded to the front face of gate 4 in encircling relation to aperture 10 and projecting forwardly therefrom is a fishtail housing 18 provided with an internal cavity 20 and having outwardly flared arcuate side walls but substantially parallel top and bottom walls so as to impart an elongated cross-sectional shape to housing 18. Welded to the enlarged forward end of fishtail housing 18 is an end plate 22 which is milled away on its forward face in the provision of an upwardly opening rectangular recess 24 which extends downwardly slightly past the center of plate 22 where it terminates in a lower margin 25. On its rear face, end plate 22 is rigidly provided with a rearwardly extending triangular block 26 which fits within cavity 20 of housing 18 and snugly engages the top and bottom walls thereof, the block 26 terminating at an apex located immediately forward from aperture 10 of gate 4. The rearwardly converging side faces of block 26 are located in inwardly spaced relation to the side walls of housing 18 in the formation of two forwardly diverging passageways 28, 30, which open into a pair of apertures 32 located in opposite sides of end plate 22, the apertures 32 having arcuate end margins which register with the arcuate side faces of passageways 28, 30.

Figure 1:
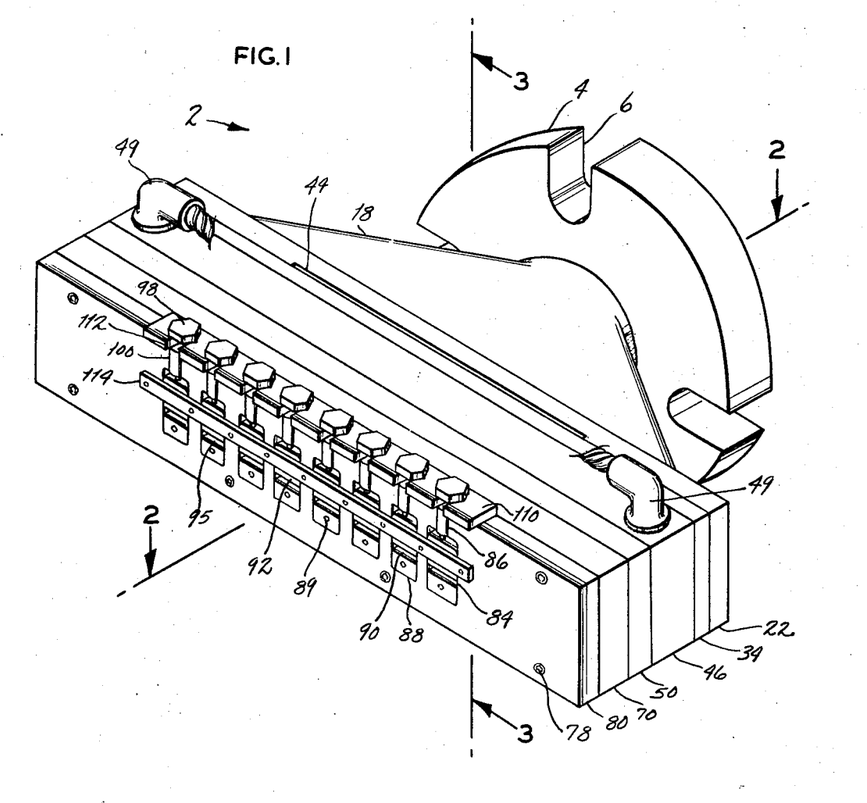
FIG. 1 is a perspective view of an extrusion die constructed in accordance with and embodying the present invention.
Figure 2:
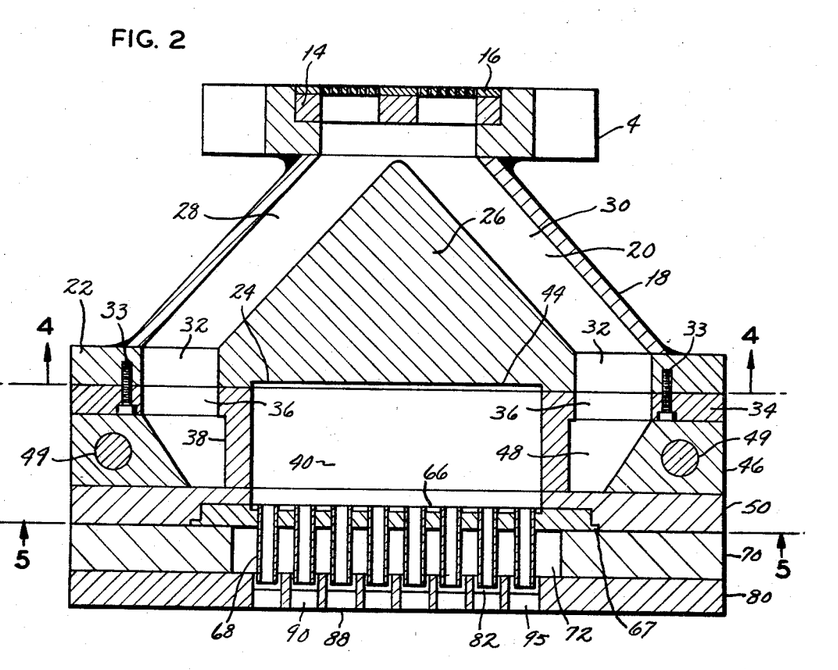
FIGS. 2 and 3 are sectional views taken along lines 2—2 and 3—3, respectively, of FIG. 1.
Figure 3:
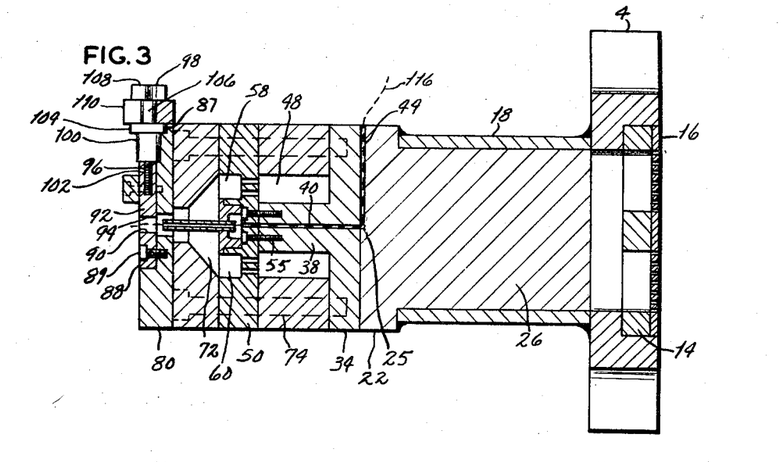
Figure 4:
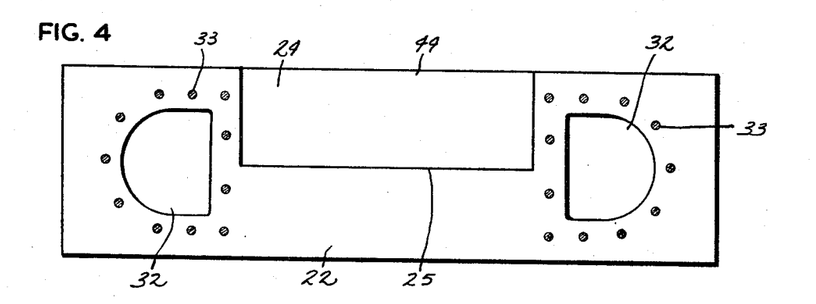
FIGS. 4 and 5 are sectional views taken along lines 4—4 and 5—5, respectively, of FIG. 2.
Figure 5:
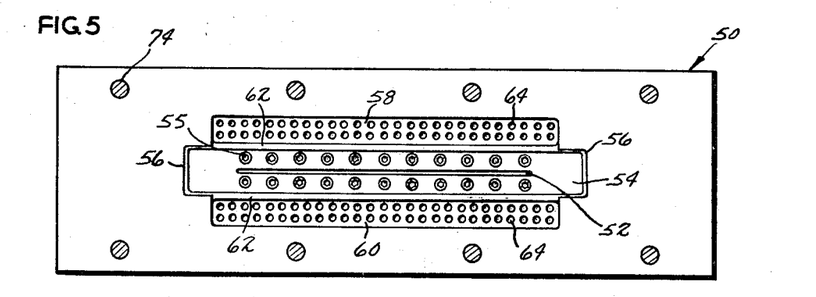
Figure 6:
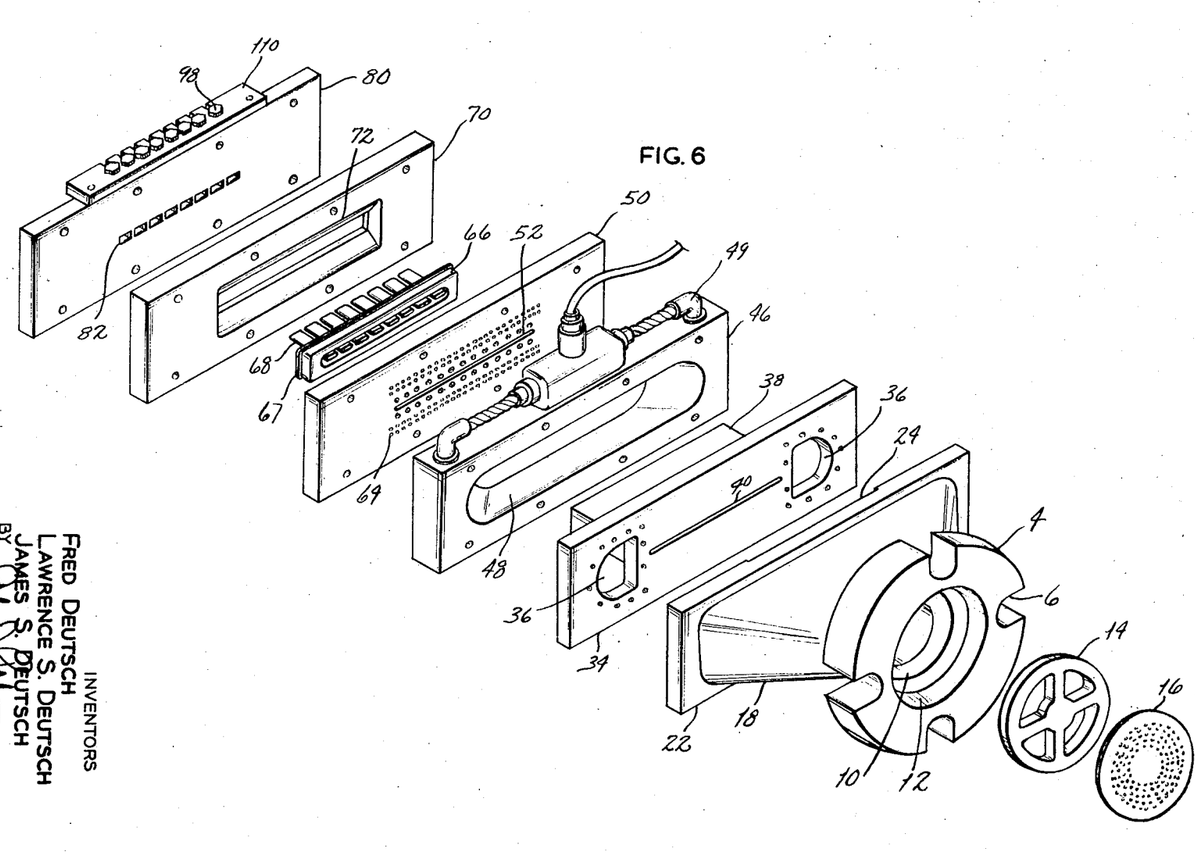
FIG. 6 is an exploded perspective view of the extrusion die.

Bolted snugly against the forward face of end plate 22 by means of countersunk bolts 33 is an intermediate plate 34 also having a pair of apertures 36 which marginally register with apertures 32 formed in end plate 22. Interposed between apertures 36 of intermediate plate 34 is an elongated rectilinear boss 38 which projects forwardly and terminates in a planar forward face located a substantial distance beyond the forward face of plate 34. Boss 38 is centrally provided with a longitudinally and rearwardly extending slit 40, the lower margin of which registers with lower margin 25 formed in end plate 22 so as to establish communication with rectangular recess 24 formed in end plate 22, the recess 24 and intermediate plate 34, in effect, conjointly forming an upwardly opening slot 44 which communicates with slit 42 and forms a feeder channel therewith.

Bolted to the face of intermediate plate 34 is a rear accumulator plate 46 having a central accumulator cavity 48 which receives rectilinear boss 38. The interior surfaces defining cavity 48 are located in outwardly spaced relation to boss 38 so that fluent material can completely surround the latter within the confines of the former. The rear margin of cavity 48, moreover, at its ends, is arcuate and marginally registers with the arcuate sides of apertures 36.

Forwardly from apertures 36, the internal side faces of cavity 48 converge inwardly so that the front margin of cavity 48 is considerably smaller than its rear margin, but nevertheless is located in spaced relation to the forward edges of boss 38. In this connection, it should be noted that the planar front face of rear accumulator plate 46 is coplanar with the forward planar face of rectilinear boss 38. Embedded within accumulator plate 46 on each side of cavity 48 are electric heating units 49, although it should be understood, in this regard, that accumulator plate 46 can be provided with steam jackets or any other suitable heating arrangement.

Rigidly held in facewise abutment with the coplanar forward faces of boss 38 and accumulator plate 46 is a distributor plate 50 having a central slot 52 which marginally registers with slit 40 formed in boss 38. Plate 50 in surrounding relation to slot 52 is milled away from its forward face in the provision of an elongated recess 54 and extending through the base of recess 54 into boss 38 are a plurality of bolts 55 which hold the rear face of plate 50 in snug abutment with the forward face of boss 38. At the end margins of recess 54 plate 50 is further milled away in the formation of shallow marginal recesses 56. Adjacent the upper and lower margins of elongated recess 54 plate 50 is provided with upper and lower distributing recesses 58, 60, which are separated from elongated recess 54 by means of narrow longitudinally extending rims 62, the upper faces of which are coplanar with the bases of marginal recesses 56. Extending through plate 50 at upper and lower elongated recesses are a multiplicity of closely spaced apertures 64 which open rearwardly into cavity 48 above and below boss 38.

Slidably but snugly fitted within enlongated recess 54 is a feeder head 66 having a forwardly presented peripheral lip 67 which at its ends fits within marginal recesses 56 and along its sides overlies longitudinally extending rims 62 adjacent upper and lower recesses 58, 60, thereby completely sealing elongated slot 52 from apertures 64. Feeder head 66 is rigidly provided with a plurality of forwardly projecting longitudinally spaced tubular feeder tips 68 which extend entirely through feeder head 66 where their internal channels communicate with elongated slot 52.

Mounted in facewise abutment with distributor plate 50 is a front accumulator plate 70 having an elongated central cavity 72, the walls of which surround but are located in closely spaced relation to forwardly projecting feeder tips 68. Along the upper and lower rear margins of cavity 72 accumulator plate 70 is beveled outwardly to provide sufficient clearance between feeder head 66 and apertures 64 so that the fluent material will not be unduly impeded beyond apertures 64. Forward accumulator plate 70, distributor plate 50, rear accumulator plate 46, and intermediate plate 34 are all held in facewise abutment and in stacked relation with respect to one another by means of bolts 74, the shanks of which thread into intermediate plate 34 while the heads are countersunk in front accumulator plate 70.

Bolted to front accumulator plate 70 by means of bolts 78 is a face plate 80 having a plurality of longitudinally spaced apertures 82 which encircle the ends of feeder tips 68 but do not engage them so that a void exists completely around each feeder tip 68. In this connection it is significant to note that feeder tips 68 project forwardly to a point located slightly inwardly from the forward margins of apertures 82. Face plate 80 is milled inwardly from its forward face at each aperture 82 in the formation of vertical guideways 84, each of which upwardly merges into a semicircular groove 86, which terminates at a radially enlarged shallow semicircular recess 87 located at the upper surface of plate 80. Fitted into the base of each guideway 84 is a rigid lower lip 88 which is held securely by means of a bolt 89. Each lip 88 upwardly terminates at an extrusion land 90 located slightly above the lower margin of the particular aperture 82 with which it is associated. Slidably mounted in the upper portion of each guideway 84 is a movable upper lip 92, the outer face of which is flush with the forward planar face of face plate 80. Each movable lip 92 downwardly terminates at an extrusion land 94 located in spaced relation to its corresponding extrusion land 90 in the formation of an extrusion aperture 95. At their opposite or upper ends, each upper lip 92 is provided with a downwardly extending threaded bore 96 into which is threaded an adjusting bolt 98. More particularly, each adjusting bolt 98 includes a cylindrical intermediate portion 100 which fits rotatably in a semicircular groove 86. At its lower end, intermediate portion 100 merges into a reduced threaded end portion 102 which engages the threads of bore 96, while at its opposite end intermediate portion 100 merges into a diametrally enlarged flange 104 which fits within, but does not extend above, shallow semicircular recess 87. Upwardly beyond flange 104, each bolt 98 is provided with a reduced upper shank portion 106 and a head 108. Bolted to the upper face of face plate 80 is an upper retainer bar 110 having a thickness substantially equivalent to the axial distance between heads 108 and flanges 104 of bolts 98. Retainer bar 110 is cut inwardly from its forward face adjacent each semicircular recess 87 in the provision of a plurality of U-shaped notches 112 which rotatably accept the shank portion 106 of each bolt 98, so as to preclude axial movement of bolts 98 within semicircular grooves 86. Similarly bolted to face plate 80 and extending across vertical guideways 84 thereof is a forward retainer bar 114 which engages the outer surfaces of movable lips 92 and prevents forward withdrawal of them from guideways 84. By reason of the foregoing construction, the vertical disposition of movable inserts, and, of course, the distance between lands 90 and 94 can be altered merely by turning adjusting bolts 98. It should be noted that lips 88 and 92 are in most instances fashioned from somewhat harder steel than face plate 80, the particular hardness of such lips being dictated by the nature of the material extruded. Similarly it is often desirable to form feeder tips 68 from hardened or tool steel.

In operation, gate 4 is securely bolted to the outlet end of the barrel on an extruding machine. Thereafter, ribbon-like strips of gauze 116 or other suitable material are passed through slot 44, slit 40, and feeder tips 68 from which a short length of gauze is allowed to depend beyond face plate 80. This can best be accomplished by feeding a short section of piano wire reversely through extrusion apertures 95, feeder tips 68, and up through slot 44. After the end of the piano wire projecting beyond slot 44 is attached to the gauze, the wire is pulled forwardly through the die and it, in turn, draws the gauze through slot 44, slit 40, feeder tips 68, and extrusion apertures 95. Adjusting bolts 98 are rotated, if necessary, to adjust the distance between extrusion lands 90, 94, so as to obtain the desired size of extrusion aperture 95. Inasmuch as the pitch of the threads on adjusting bolts 98 is known, each rotation of a bolt 98 will represent a known change in the size of its corresponding extrusion aperture 95. Subsequently, the extrusion machine is energized and it forces a plastic melt through screen 16 into housing 18 wherein the fluent material is divided into two channels confined by the walls defining passageways 28, 30. After the fluent material passes through apertures 32 in end plate 22 and apertures 36 in intermediate plate 34 it enters central cavity 48 of rear accumulator plate 46 and completely surrounds rectilinear boss 38 disposed therein. At this point, it is significant to note that the forwardly tapering side surfaces of cavity 48 urge the fluent material toward the center and aid in establishing a substantially uniform pressure within central cavity 48 across the entire width thereof. Inasmuch as the plastic melt is at uniform pressure without cavity 48 it will exude from each aperture 64 of distributor plate 50 at approximately the same velocity. The fluent material thereupon enters elongated cavity 72 of front accumulator plate 70 and completely surrounds feeder tips 68 disposed therein. Continued advance of the fluent material causes it to flow out through extrusion apertures 95 formed by lands 90, 94, of lips 88, 92, respectively. Inasmuch as feeder tips 68 terminate prior to the outer margins of lands 90, 94, the advancing fluent material flows around the ribbon-like strips of gauze 116 and embeds gauze 116 within the extruded product as it leaves plate 80.

In view of the fact that die 2 possesses a plurality of extrusion apertures 95 it is possible to extrude a number of products at one time by the use of one extrusion machine. This, in turn, results in a monetary saving of considerable magnitude. As previously noted, this end is achieved by obtaining a substantially uniform pressure across the entire width of rear accumulator plate 46 which, in turn, results from dividing the incoming plastic melt into two channels and subsequently merging those channels to the rear of distributor plate 50. In other words, by introducing the plastic melt into cavity 48 in two channels located at each end thereof and then urging the flow toward the center of cavity 48 by use of inwardly tapering side walls, it is possible to obtain substantially uniform pressure distribution throughout the entire mass of fluent material located within cavity 48 to the rear of distributor plate 50. any slight variations in pressure can be readily compensated for by turning adjusting bolts 98 so as to precisely control the size of the extrusion. Conventional dies, on the other hand, introduce the fluent material from the center and therefore have relatively high pressure in the central portions of the fluent material and reduced pressures at the sides. This, in turn, results in uneven extrusion velocities as well as varying sizes from the extrusion apertures.

Figure 7:
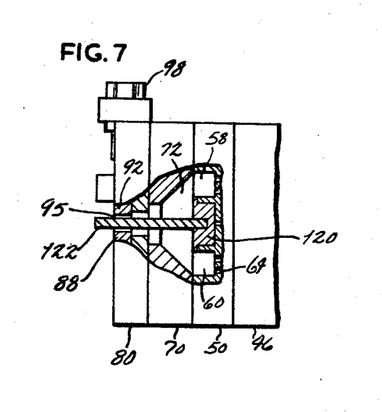
FIG. 7 is a fragmentary side elevational view, partially broken away and in section, of the extrusion die adapted to extrude a tubular configuration.

Referring now to FIG. 7, it is possible to extrude tubular forms from die 2 merely by removing face plate 80 and feeder head 66, and thereafter replacing the latter with a somewhat similar feeder head 120 having solid feeder tips 122 which extend forwardly through extrusion apertures 95 to a terminal point located slightly beyond the forward face of face plate 80. Thus, as the fluent material flows through extrusion apertures 95, a void is formed therein by solid feeder tips 122 which results in a tubular extruded configuration. Of course, to extrude completely solid configurations, a feeder head 126 having no feeder tips whatsoever should be employed, as best seen in FIG. 8.

Also it is significant to note that lands 90, 94, need not necessarily be planar, but can be arcuate or for that matter of any other contour. Thus, by merely replacing lips 88 or 92 or both, one can quickly change the cross-sectional configuration of the extruded product.

Figure 8:
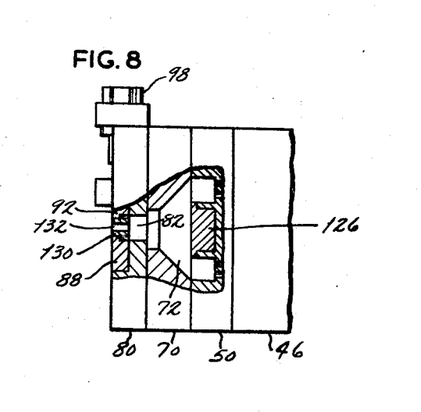
FIG. 8 is a fragmentary side elevational view, partially broken away and in section, of the extrusion die adapted to extrude a solid configuration, the lips of the die further holding an extrusion insert.

Moreover, as also seen in FIG. 8, it is possible to utilize rigid lower lip 88 and movable upper lip 92 as vise jaws for holding a removable insert 130 having an extrusion aperture 132 which can have practically any desired configuration. In such an instance, it is desirable to employ stepped lands 134, 136, on lips 88, 92. These stepped surfaces engage complementary stepped upper and lower surfaces on insert 130 so as to preclude the fluent material from forcing insert 130 outwardly. Accordingly, a large number of different configurations can be extruded from die 2 at a minimum tooling cost inserting by inserting different inserts between upper and lower lips 92, 88, or by using lips 88, 92, having lands shaped to the desired contour. Similarly, a number of different configurations can be extruded at one time by using different inserts 130 between each pair of upper and lower lips 92, 88.

To provide greater versatility face plate 80 can be modified slightly by replacing rigid lower lips 88 with movable lower lips which are very similar to movable upper lips 92 and their related components. By means of such a construction the vertical disposition of extrusion aperture 95 as well as its size can be readily and conveniently altered. Similarly, inserts 130 can be precisely located with respect to feeder tips 68 or 122.

Figure 9:
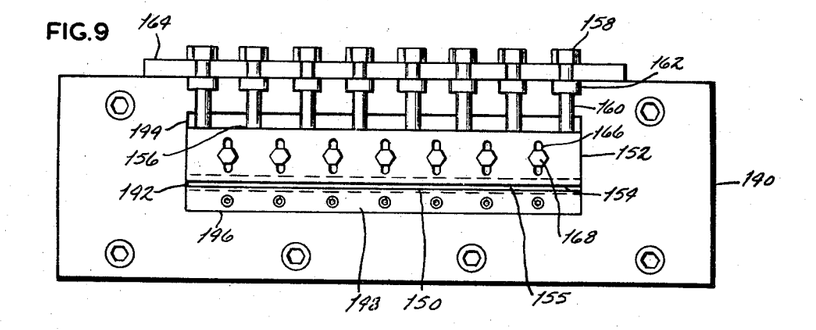
FIG. 9 is a front elevational view of a modified form of face plate adapted for extruding sheet material and forming part of the present invention.

Furthermore, sheet material can be extruded from die 2 as best seen in FIG. 9. This is accomplished by using a face plate 140 which bolts to front accumulator plate 70 similar to face plate 80. Fact plate 140, however, is provided with an elongated cut-out 142 and from its forward face is relieved in the formation of upper and lower forward recesses 144, 146. Bolted into lower recess 146 is a lower lip 148 having an extrusion land 150 located slightly above the lower margin of elongated cut-out 142. Slidably mounted in upper recess is an upper lip 152 having a downwardly presented extrusion land 154 located opposite land 150, lands 150, 154 in effect forming an extrusion slit 155. Upper lip 152 is further provided with a plurality of longitudinally spaced upwardly opening threaded bores 156 which accept threaded adjusting bolts 158. Adjusting bolts 158 are similar to adjusting bolts 98 and further fit within semicircular grooves 160 and recesses 162 which are similar to grooves 86 and recesses 87, respectively, of face plate 80. Bolted to the upper face of face plate 140 is a retainer bar 164 for preventing axial displacement of adjusting bolts 158. Intermediate threaded bores 156 upper lip 152 is provided with a plurality of spaced vertically extending elongated cut-outs 166 through which retainer bolts 168 fit and are thereafter threaded into face plate 140 so as to prevent outward withdrawal of upper lip 152. Thus, the size of extrusion slit 155 can be altered by first retracting retainer bolts 168 and then turning adjusting bolts 158. This, in turn, affords precise control over the thickness of the extruded sheet. Moreover, a flexible sheet material can be embedded in the extrusion merely by using a feeder head similar to feeder head similar to feeder head 66 but having an elongated feed tip which fits within cut-out 142.

Figure 10:
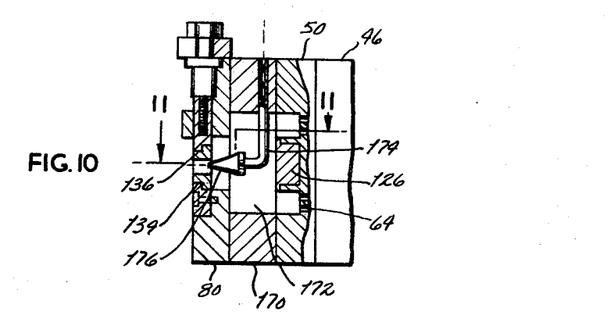
FIG. 10 is a fragmentary side elevational view, partially broken away and in section, of a modified extrusion die forming part of the present invention.
Figure 11:
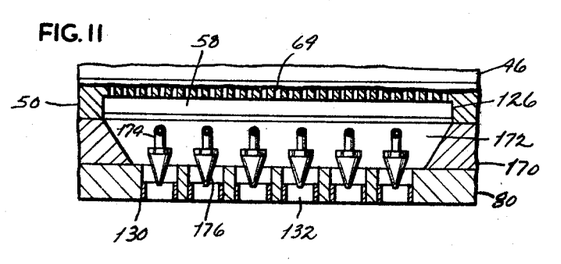
FIG. 11 is a sectional view taken along line 11—11 of FIG. 10.

Referring now to FIGS. 10 and 11, it is possible to provide die 2 with a modified form of front accumulator plate 170 which can be bolted against distributor plate 50 in a manner similar to front accumulator plate 46. Accumulator plate 170, however, possesses an elongated internal cavity 172 rearwardly terminating at a rear margin which completely encircles apertures 64 of distributor plate 50 so as to receive the flow of plastic melt as it exudes therefrom. The lateral end surfaces of cavity 172 are arcuate and furthermore taper or forwardly converge so that the forward margin of cavity 172 is smaller than its rear margin. Nevertheless, the forward margin is sufficient in size to encircle central apertures 82 of face plate 80. Firmly embedded within front accumulator plate 170 and projecting downwardly into cavity 172 where they are bent 90° so as to project forwardly are a plurality of feeder tubes 174, each of which is provided at its end with a nozzle-like feeder tip 176. Feeder tips 176 align with extrusion apertures 132 and terminate within the confines thereof. When a wire or string is fed through feeder tubes 174 and tips 176 it will become embedded in the extrusion as the plastic melt passes through extrusion aperture 95. Of course, feeder tips 176 can project into apertures formed in removable inserts 130 and, in particular, the circular apertures formed therein.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An extrusion die comprising a die body having an inlet port for receiving fluent material, the die body being internally provided with at least two forwardly diverging passageways extending from the inlet port at their rear ends, the die body being further provided with an intermediate accumulator cavity into which the passageways open in spaced relation to one another at their forward ends, a distributor element mounted on the die body across the forward end of the accumulator cavity and having a plurality of distribution apertures communicating with the accumulator cavity, a face plate mounted on the die body in front of the distributor element and having at least one extrusion aperture through which the fluent material exudes in an extruded configuration.

2. A die according to claim 1 and further characterized by a feeder head rigidly mounted against the distributor element and including at least one feeder tip which extends forwardly toward the extrusion aperture.

3. A die according to claim 2 in which the feeder tip extends completely through and terminates slightly beyond the forward margin of the extrusion aperture whereby a tubular extrusion is formed.

4. A die according to claim 2 in which the die body is further provided with a boss located within the confines of the accumulator cavity intermediate the forward ends of passageways and having its forward end in sealingwise engagement with the rear of the distributor element; the die body being further provided with a feeder channel which extends from the forward face of the boss through the boss and terminates at an outer surface of the die body in spaced relation to the inlet whereby the interior of the feeder channel is not exposed to the fluent material, the feeder tips being tubular and communicating with the feeder channel so that elongated solid material can be fed through the feeder channel and tubular feeder tips into the fluent material as it exudes from the extrusion apertures, whereby the elongated solid material is embedded in the extruded fluent material.

5. A die according to claim 2 in which the accumulator cavity is elongated and has end walls which forwardly converge.

6. A die according to claim 5 and further characterized by a forward accumulator plate interposed between the distributor element and face plate and having an elongated cavity through which the feeder tips project, the apertures of the distributor element opening into the elongated cavity.

7. A die according to claim 6 in which the face plate is provided with a plurality of extrusion apertures and in which each feeder tip projects toward a separate extrusion aperture.

8. A die according to claim 7 in which the boss abuts against the rear face of the distributor element and is provided with a center aperture which marginally registers with the feeder channel, and in which the feeder head includes a feeder plate having the feeder tips projecting forwardly therefrom, the feeder plate being secured to the distributor element in encircling relation to the center aperture so that fluent material within the elongated cavity of the front accumulator plate will not enter the feeder channel, the distribution apertures being located in spaced relation from the feeder plate.

9. A die according to claim 1 and further characterized by a front accumulator plate having an elongated cavity into which the distributor apertures open, feeder tubes rigidly secured to the front accumulator plate and extending into the elongated cavity, the feeder tubes forwardly terminating within the extrusion apertures so that elongated solid material can be fed through the feeder tubes and into fluent material as it exudes from the extrusion apertures whereby to embed the solid material in the extrusion.

10. The extrusion die of claim 1 wherein a first lip extends across a portion of each extrusion aperture and terminates in an extrusion land extending across its respective aperture whereby to define one margin of the extrusion aperture through which the fluent material is extruded, and means engaging the lip for changing its position to alter the size of the extrusion aperture.

11. For use in combination with a die body having a central cavity at its forward end; a rigid plate member detachably fastened to said die body over said central cavity, said plate member including at least one extrusion aperture extending therethrough in alignment with an in communication with the flow of fluent material from said cavity, the forward end of said extrusion aperture being formed in an elongated guideway; a lip slidably mounted within said guideway for movement over said extrusion aperture; said lip terminating in an extrusion land which defines a movable perimetric edge for said extrusion aperture; a rotatable adjustment means mounted on said plate member and threadably engaging said lip; means holding said adjustment means against axial movement; whereupon rotation of said adjustment means causes said lip to move within said guideway to adjust the size of said extrusion aperture.

12. The device of claim 11 wherein said guideway merges into a groove in the forwardly presented face of said plate member, said adjustment means extending through said groove to engage said lip; and a retainer means is detachably secured across said guideway so that it engages said lip to prevent its forward withdrawal from said guideway.

13. The device of claim 11 wherein the forwardly presented face of said lip is flush with the forwardly presented face of said plate member.

14. The device of claim 11 wherein said plate member includes a plurality of extrusion apertures similar to said previously mentioned extrusion aperture and each similarly provided with a guideway, an extrusion land, and an adjustment means.

15. The device of claim 11 wherein said guideway is vertically disposed and said lip is mounted adjacent the upper end of said guideway, and a lower extrusion land is provided at the lower end of said guideway, said lower extrusion land being engaged by a lower adjustment means.

16. The device of claim 11 wherein an extrusion insert having an aperture formed therein is inserted within said extrusion aperture so that fluent material exudes from said aperture in said insert.

References Cited

UNITED STATES PATENTS

| | | |
|---|---|---|
| 2,401,551 | 6/1946 | Cook. |
| 2,754,543 | 7/1956 | Loew. |
| 3,019,746 | 2/1962 | Cunningham et al. __ 18—12 XR |
| 3,059,939 | 10/1962 | Palasthy __________ 18—12 XR |
| 3,118,179 | 1/1964 | Bonner. |
| 3,196,486 | 7/1965 | Shesler et al. |
| 3,323,172 | 6/1967 | Pierson et al. _______ 8—12 XR |
| 3,344,473 | 11/1967 | Achterberg et al. |
| 1,350,722 | 8/1920 | Goodenberger. |
| 2,047,395 | 7/1936 | Stelkens. |

WILLIAM J. STEPHENSON, Primary Examiner

PO-1050
(5/69)

UNITED STATES PATENT OFFICE
CERTIFICATE OF CORRECTION

Patent No. 3,474,495               Dated   October 28, 1969

Inventor(s)  Fred Deutsch, Lawrence S. Deutsch, and James S. Deuts

It is certified that error appears in the above-identified patent and that said Letters Patent are hereby corrected as shown below:

Column 2, line 7, "provisions" should read -- provision --.
Column 5, line 49, "without" should read -- within ---; line 60, "leaves plate 80" should read -- leaves face plate 80 --.
Column 6, line 3, "any" should read -- Any --; lines 40 and 41, "inserting by inserting" should read -- merely by inserting --; line 57, "Fact plate" should read -- Face plate --. Column 7, lines 9 and 10, "feeder head similar to feeder head similar to feeder head 66" should read -- feeder head similar to feeder head 66 --. Column 8, line 54, "an" should read -- and --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents